UNITED STATES PATENT OFFICE.

CHAUNCEY R. STUNTZ, OF COLUMBIA TOWNSHIP, HAMILTON COUNTY, OHIO.

IMPROVEMENT IN COMPOSITIONS FOR PRODUCING SULPHURETED HYDROGEN.

Specification forming part of Letters Patent No. 197,574, dated November 27, 1877; application filed November 18, 1876.

*To all whom it may concern:*

Be it known that I, CHAUNCEY R. STUNTZ, of the township of Columbia, county of Hamilton, and State of Ohio, have invented a Powder-Producing Sulphureted Hydrogen by Heat, of which the following is a specification:

The object of my invention is to provide chemists with material for an economic supply of sulphureted hydrogen, in amount under better control and of better quality than that ordinarily made, and produced from apparatus that is cheap and of convenient form, without the use of acid.

The material is a powder formed by an intimate mixture of gas-coal tar, produced in the manufacture of illuminating-gas, and an amount of sulphur equivalent to the hydrogen of the gas-coal tar, or in excess.

When the gas is prepared in fragile vessels the powder is diluted with from one-half to two-thirds of its weight of inert sand or clay, which renders the residual coke friable, so that it can be removed more safely.

The formula of the sample is two parts, by weight, of gas-coal tar, three of sulphur, and four of sand, ground to a powder and mixed intimately.

To operate with the mixture, fit a six-inch test-tube with a large quill-tube, bent in the usual manner, having the horizontal portion long enough to condense the excess of sulphur four to six inches, fill to the depth of half an inch, (about 2 c. c.,) and apply a gentle heat; gas will be set free sufficient for two qualitative tests.

If the lamp is removed at any time, the apparatus cools quickly and the flow of gas stops.

I claim—

A composition powder for the production of sulphureted hydrogen, consisting of coal-tar and sulphur, substantially as described.

C. R. STUNTZ.

Witnesses:
JOSEPH SCHULTZ,
E. H. ANTHONY.